(12) United States Patent
Hadjidj

(10) Patent No.: US 12,397,916 B2
(45) Date of Patent: Aug. 26, 2025

(54) INTEGRATED UNIT FOR TRANSFERRING ROTARY POWER FROM AN ELECTRICAL CHAIN FOR DE-ICING PROPELLER BLADES AND THE NOSE CONE OF A TURBOMACHINE

(71) Applicant: SAFRAN ELECTRICAL & POWER, Blagnac (FR)

(72) Inventor: Djemouai Hadjidj, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 18/851,451

(22) PCT Filed: Mar. 28, 2023

(86) PCT No.: PCT/FR2023/050443
§ 371 (c)(1),
(2) Date: Sep. 26, 2024

(87) PCT Pub. No.: WO2023/187292
PCT Pub. Date: Oct. 5, 2023

(65) Prior Publication Data
US 2025/0100695 A1 Mar. 27, 2025

(30) Foreign Application Priority Data
Mar. 31, 2022 (FR) .................. 2202967

(51) Int. Cl.
*H05B 3/22* (2006.01)
*B64C 27/473* (2006.01)
*B64D 15/12* (2006.01)

(52) U.S. Cl.
CPC ............ *B64D 15/12* (2013.01); *B64C 27/473* (2013.01); *H05B 3/22* (2013.01)

(58) Field of Classification Search
CPC .......... B64D 15/12; B64C 27/473; H05B 3/22
See application file for complete search history.

(56) References Cited

U.S. PATENT DOCUMENTS

| 2007/0075188 A1* | 4/2007 | Stoner | F01D 25/02 244/134 D |
|---|---|---|---|
| 2011/0290942 A1 | 12/2011 | Imbert et al. | |
| 2013/0307378 A1* | 11/2013 | Giordano | B64C 27/32 310/67 R |
| 2015/0108760 A1 | 4/2015 | De Wergifosse et al. | |

OTHER PUBLICATIONS

Search Report and Written Opinion issued in International Application No. PCT/FR2023/050443, mailed Jul. 11, 2023.

* cited by examiner

Primary Examiner — Edward F Landrum
Assistant Examiner — Kuangyue Chen
(74) Attorney, Agent, or Firm — Bookoff McAndrews, PLLC

(57) ABSTRACT

An integrated unit for de-icing the propeller blades and the nose of a turbomachine including: a rotary transformer including a static part and a rotary part; a DC-to-AC voltage converter connected at its output to the static part of the rotary transformer and intended to be connected at its input to a DC electrical power supply, and a power switch connected to the rotary transformer and configured to transmit electrical power to at least one pair of propeller blades and to the nose cone of the turbomachine.

10 Claims, 5 Drawing Sheets

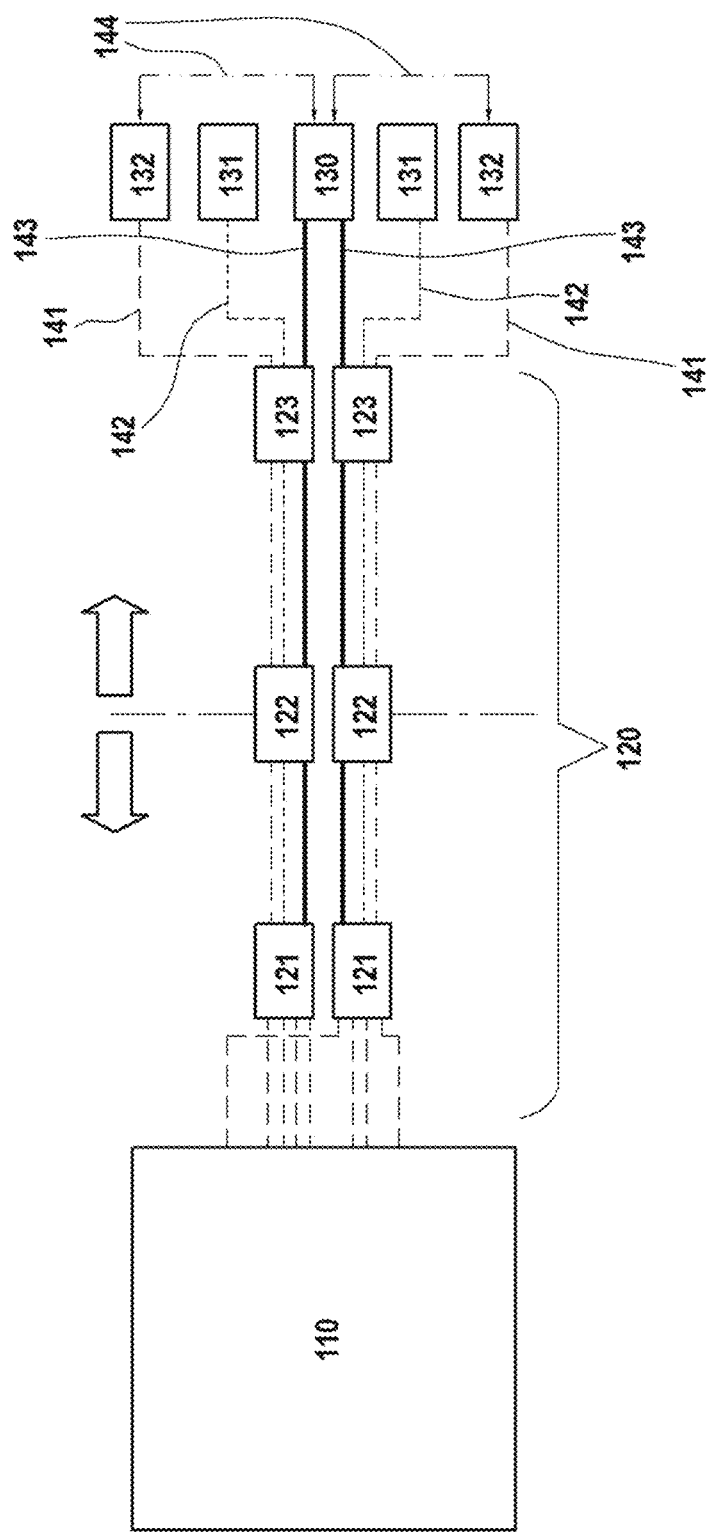
[Fig. 1]
PRIOR ART

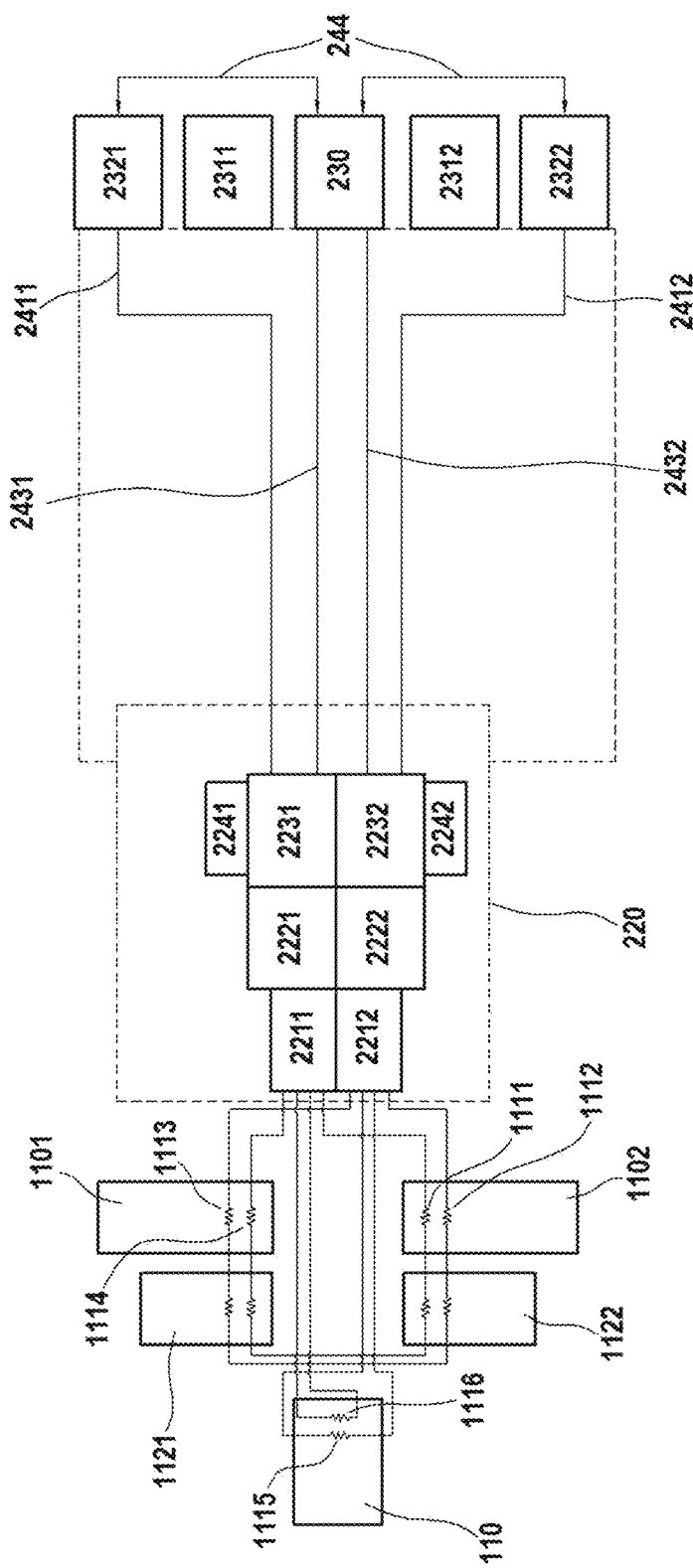
[Fig. 2]

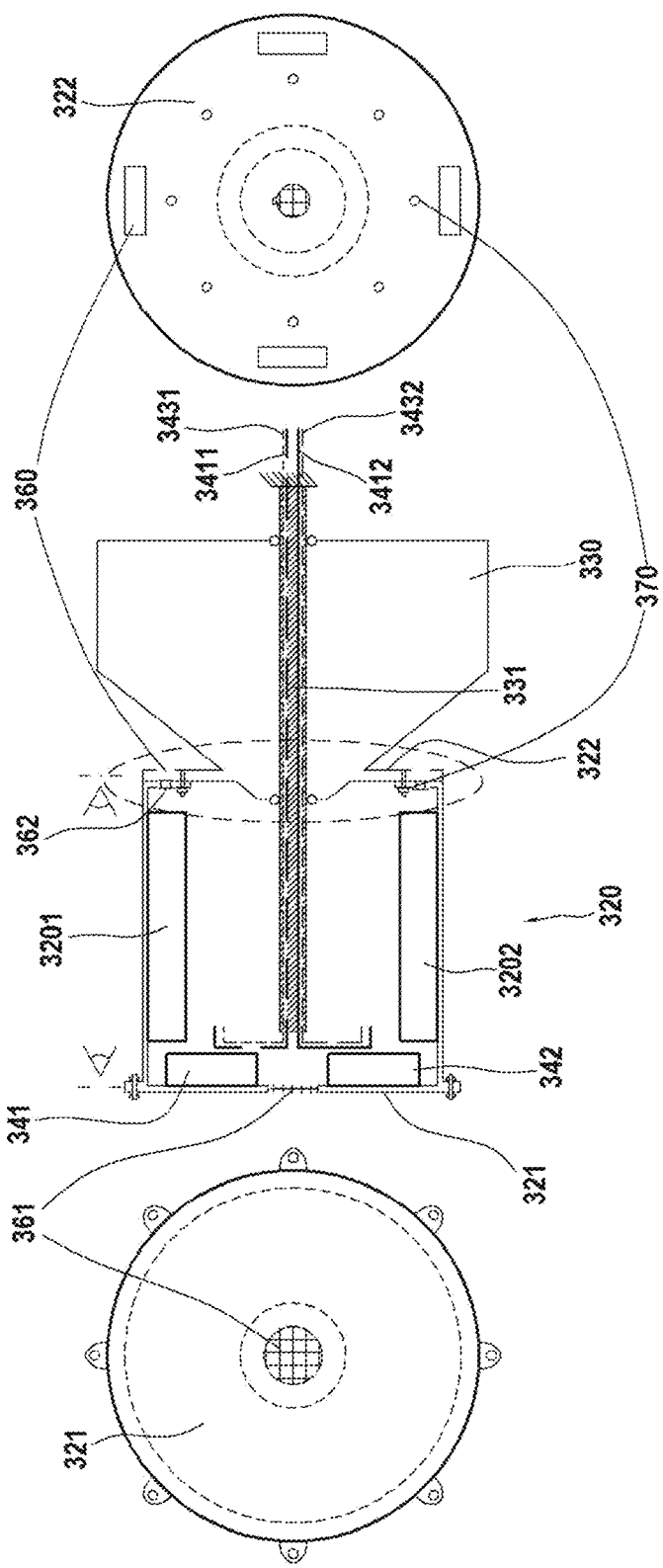
[Fig. 3]

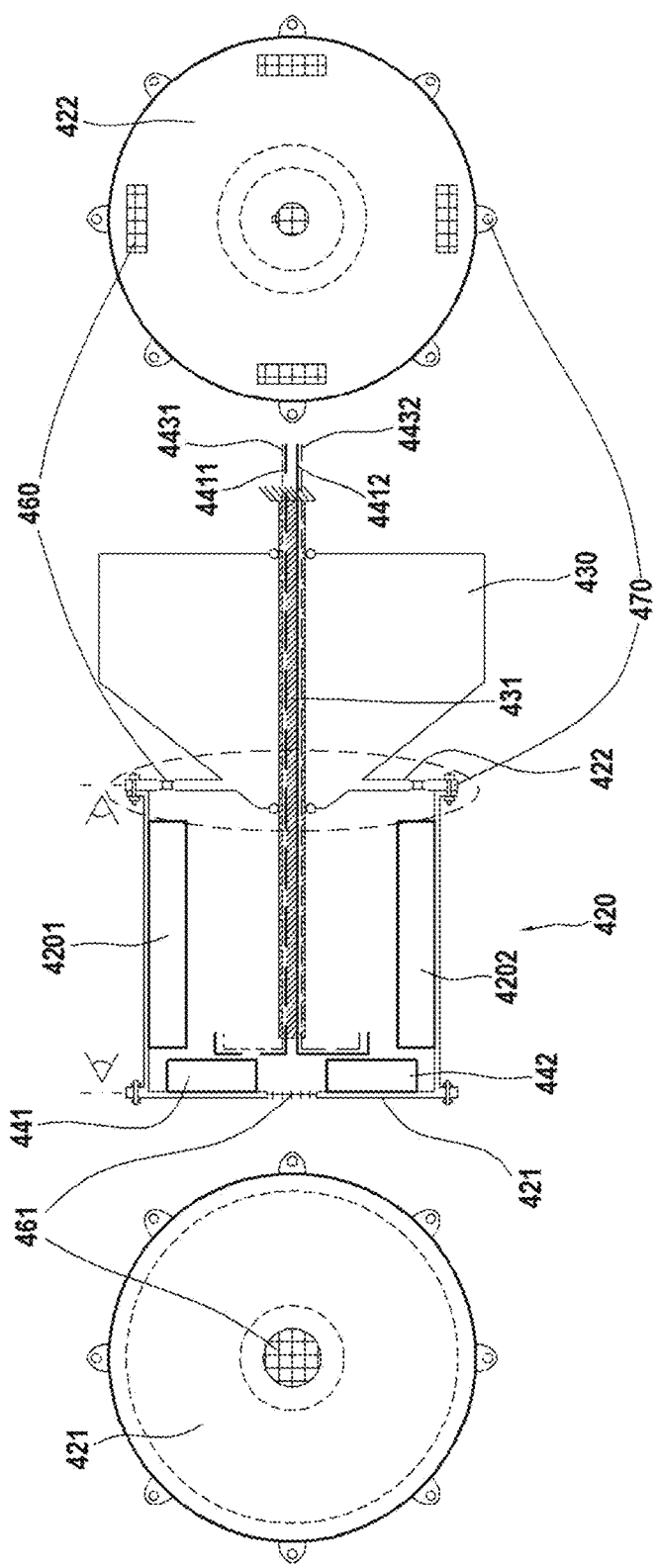
[Fig. 4]

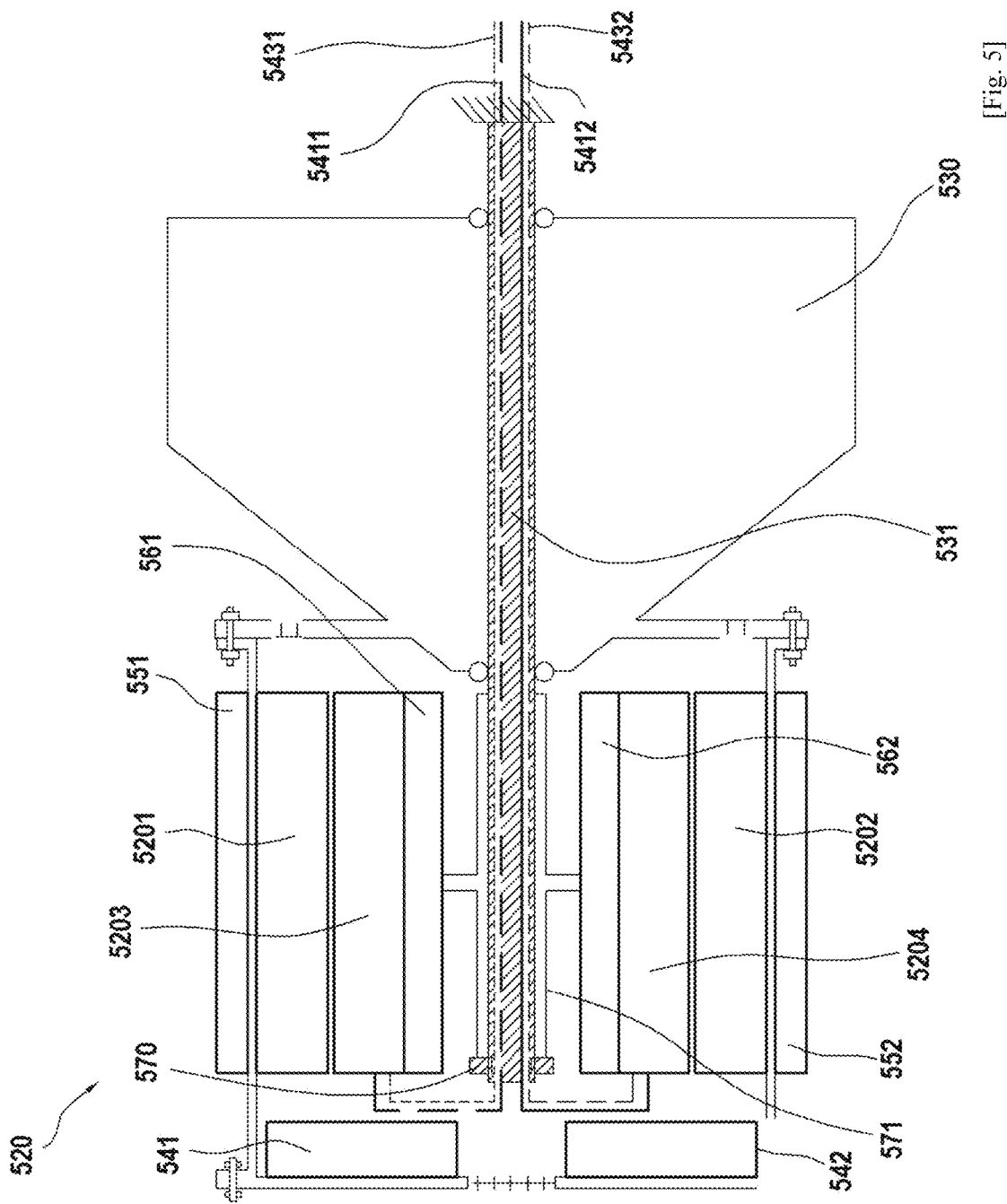
[Fig. 5]

INTEGRATED UNIT FOR TRANSFERRING ROTARY POWER FROM AN ELECTRICAL CHAIN FOR DE-ICING PROPELLER BLADES AND THE NOSE CONE OF A TURBOMACHINE

CROSS-REFERENCE TO RELATED APPLICATIONS

This is a National Stage Application under 35 U.S.C. § 371 of International Application No. PCT/FR2023/050443, filed Mar. 28, 2023, now published as WO 2023/187292 A1, which claims priority to French Patent Application No. 2202967, filed on Mar. 31, 2022, the entireties of which are incorporated herein by reference.

TECHNICAL FIELD

This invention relates to the general field of the de-icing of the propeller blades and the nose cone of a turbomachine, and more specifically to the electrical line for de-icing and for transferring power between the fixed part and the rotary part of the turbomachine.

PRIOR ART

Turbomachines comprise, from upstream downward, one or more compressor modules disposed in series, which compress air taken into an air inlet. The air is then introduced into a combustion chamber where it is mixed with a fuel and burned. The combustion gases pass through one or more turbine modules which drive the compressor or compressors. The gases are then expelled either into a nozzle to produce a propulsion force, or onto a power turbine to produce power which is taken off a transmission shaft.

Current bypass turbojet engines with a high expansion ratio, or turbofans, include a fan rotor and several stages of compressor, in particular a low-pressure compressor, and a high-pressure compressor which belong to the primary spool of the engine. Upstream of the low-pressure compressor is disposed a wheel of large blades, or fan, which supplies both a primary air path with a primary flow traversing the low-pressure and high-pressure compressors, and a secondary air path with a cold flow, or secondary flow, which is guided directly onto a cool flow nozzle, the so-called secondary nozzle. The fan is driven by the rotation shaft of the low-pressure spool.

The anti-frost protection of the propeller blades of the fan and of the nose cone of a turbomachine is based on electrothermal de-icing. Heated mats composed of a network of resistors are incorporated into the leading edges of the propellers and of the nose cone. In icy conditions, a layer of ice is deliberately left to form on the leading edges. Then, the resistances of the heated mats are powered for a predefined time period to heat the surface of the propellers and of the nose cone before detaching the layers of ice formed. With the rotation of the propellers and of the nose cone, these layers of ice are expelled by the effect of centrifugal force.

The surfaces of the turbomachine to be de-iced are large and therefore require a good deal of electrical power to supply the resistances of the heated mats, the power dedicated to de-icing coming from the generators of the airplane. FIG. 1 shows an electric circuit 120 of a de-icing system of the prior art connected to the resistances 110 of the heated mats and to the electrical power supplies 131, 132 and to the control system 130 of the turbomachine. The electrical circuit 120 comprises DC-to-AC voltage converters 123 which are used to supply AC voltage to the rotary transformers 122. To limit the power supplied to the de-icing system and to the other non-propulsion systems, the resistances 110 of one pair of propeller blades are powered solely for a given time, then the resistances of the next pair and so on, a pair being formed of one blade and its opposite, the whole being connected in series with a section of the nose cone. The alternation of the powering of the resistances 110 of the blade pairs is done using the switches 121 placed between the resistances 110 and the rotary transformers 122.

To run the electrical circuit 120 of the de-icing system, ancillary power connections are needed, such as for example ancillary power connections for the low-voltage DC power supply 142, for the high-voltage DC power supply 141 and for the communication links 143 between the parts 121, 122, 123 of the electrical circuit 120 and the control system 130 of the turbomachine. This requires the routing of numerous harnesses 141, 142, 143 in the turbomachine while observing certain restrictions on installation, such as restrictions on the radii of curvature of the harnesses or on the distances between the harnesses and/or between the components of the turbomachine. These restrictions cause an increase in the mass and volume of the turbomachine, along with a complex installation and maintenance of the de-icing system.

It is therefore desirable to possess an electrical de-icing system which complies with the installation restrictions while reducing the mass, volume and complexity of integration of the de-icing system.

SUMMARY OF THE INVENTION

The invention relates to an integrated unit for transferring rotary power from an electrical circuit for de-icing the propeller blades and the nose cone of a turbomachine comprising:
  a rotary transformer comprising a static part and a rotary part;
  a DC-to-AC voltage converter connected at its output to the static part of the rotary transformer and intended to be connected at its input to a DC electrical power supply, and
  a power switch connected to the rotary transformer and configured to transmit electrical power to at least one pair of propeller blades and to the nose cone of the turbomachine.

The invention thus makes it possible to group the switch and the converter within one and the same equipment item, the rotary transformer, to form an integrated unit for transferring rotary power. In other words, they are present locally at one and the same place in the turbomachine. The integrated unit is thus more compact and can be installed in the turbomachine in an area of small diameter, thus limiting centrifugal acceleration forces, which are very stressful and harmful to electronic components.

The fact of integrating all the components into one and the same equipment item makes it possible to reduce, or even eliminate, the numerous long cables and harnesses between the equipment items of the de-icing system, and also to reduce the number and size of the electromagnetic disturbance filters (EMI or EMC filters). The mass and volume of the electrical de-icing system can thus be reduced.

In addition, owing to the integrated unit, it is also possible to pool resources, such as the cooling and the low-voltage power supply between these three components. This also offers flexibility as regards the orientation of the connectors (axial orientation or circulation for example) to facilitate the routing of the power harnesses from the unit to the blade roots or the nose cone.

Finally, the integrated unit offers more choice as regards the design and arrangement of the components within the unit, for example to facilitate maintenance, or improve the efficiency of the cooling or the interconnections between components.

According to a particular feature of the invention, the integrated unit comprises a first electrical channel comprising the rotary transformer, the converter and the switch, and a second channel comprising a second rotary transformer comprising a static part and a rotary part, a second DC-to-AC voltage converter and a second power switch, the second converter being connected at its output to the static part of the second rotary transformer and intended to be connected at its input to a DC electrical power supply and the second switch being connected to the second rotary transformer and configured to transmit electrical power to at least one pair of propeller blades and to the nose cone of the turbomachine.

The fact of having two redundant electrical channels makes it possible to always have an operational de-icing system even in the event of failure of one of the channels.

According to another particular feature of the invention, the integrated unit comprises at least one DC-to-DC voltage converter associated with the DC-to-AC voltage converter and connected to the DC electrical power supply of the associated DC-to-AC voltage converter and configured to generate a low-voltage electrical power supply.

The presence of a DC-to-DC voltage converter (or DC/DC converter) makes it possible to generate a local low-level voltage (for example a DC voltage of 28 V), i.e. within the integrated unit. This makes it possible, for each electrical channel, to connect the integrated unit to a single high-voltage external electrical power supply and to reduce the number of cables between the unit and its environment.

According to another particular feature of the invention, the integrated unit comprises a plurality of rotary transformers in each electrical channel, and within each electrical channel, each rotary transformer is associated with a separate pair of propeller blades; the DC-to-AC voltage converter is common to the rotary transformers of the electrical channel and the switch comprises switches configured to select one of the rotary transformers of the electrical channel.

Owing to this feature, each rotary transformer is powered only during the activation time of the corresponding pair of propeller blades. This makes it possible to insert the electronics of the switch between the DC/AC converter and the rotary transformers and thus to position the switch on the static part of the integrated unit, hence eliminating the centrifugal stress on the electronics.

According to another particular feature of the invention, in each electrical channel, the rotary transformer and the power switch are combined.

This makes it possible to have only one rotary transformer in each electrical channel capable of powering all the pairs of propeller blades, the rotary transformer comprising at least as many outputs as there are blade pairs. In addition, the electronics of the switch can also be positioned on the static part of the rotary transformer.

Another subject of the invention is a turbomachine comprising an integrated unit for transferring rotary power according to the invention and a low-pressure reduction gear, the integrated unit being secured to the low-pressure reduction gear.

The low-pressure reduction gear, also known as Reduction Gear Box, or RGB, is interposed between the fan comprising the propeller blades and the low-pressure shaft of the turbomachine.

It makes it possible to drive the propeller blades of the turbomachine fan and have a lower blade rotation speed than that of the low-pressure shaft. This reduction in speed makes it possible to increase the size of the fan.

The fact of having the integrated unit secured to the low-pressure reduction gear makes it possible to have a de-icing system close to the reduction gear and to make provision for a de-icing system that is more compact, more effective, lighter and has more accessible, and hence simplified, maintenance.

According to a particular feature of the invention, the low-pressure reduction gear comprises a rotary part and a fixed shaft, the rotary part of each of the rotary transformers of the integrated unit is secured to the rotary part of the low-pressure reduction gear, and the static part of each of the rotary transformers, the power switches and the DC-to-AC voltage converters of the integrated unit are secured to the fixed shaft of the low-pressure reduction gear.

According to another particular feature of the invention, the low-pressure reduction gear comprises a rotary part and a fixed shaft, the rotary part of each of the rotary transformers and the power switches of the integrated unit are secured to the rotary part of the low-pressure reduction gear and the static part of each of the rotary transformers and DC-to-AC voltage converters of the integrated unit are secured to the fixed shaft of the low-pressure reduction gear.

These two variants of assembly of the integrated unit to the fixed (fixed shaft) and rotary parts of the low-pressure reduction gear make it possible to eliminate the bearings on the integrated unit and thus improve its reliability and its lifetime. They also make it possible to dispense with imbalance effects and movements, by being close to the bearing hangers of the reduction gear, to have reduced mechanical play between the fixed and rotary parts of the integrated unit, to make savings on mass, particularly at the rotary transformer, to make savings on volume and improve the efficiency of the entire electrical de-icing system, and finally to have an under-wing equipment item that is accessible and replaceable without any specific tools to simplify maintenance, mounting and dismounting operations.

According to another particular feature of the invention, the turbomachine comprises fins located on an outer surface of the integrated unit and secured to the rotary part of the low-pressure reduction gear.

The fins make it possible to create a forced air flow around the integrated unit making it possible to cool the components of the integrated unit assembled on the rotary part of the reduction gear.

According to another particular feature of the invention, the turbomachine comprises a fan secured to the rotary part of the low-pressure reduction gear.

The fan makes it possible to blow air to cool the components of the integrated unit assembled on the rotary part of the reduction gear. The components assembled on the fixed part can also benefit from this air for their cooling. The fan can advantageously be combined with the fins to improve the cooling of the integrated unit.

BRIEF DESCRIPTION OF THE DRAWINGS

Other features and advantages of this invention will become apparent from the description given below, with reference to the appended drawings which illustrate exemplary embodiments thereof without any limitation.

FIG. 1 represents, schematically and partially, a de-icing system of the prior art.

FIG. 2 represents, schematically and partially, an integrated unit of a de-icing system according to an embodiment of the invention.

FIG. 3 represents, schematically and partially, the assembly of the rotary parts of the integrated unit on a low-pressure reduction gear according to an embodiment of the invention.

FIG. 4 represents, schematically and partially, the assembly of the rotary parts of the integrated unit on a low-pressure reduction gear according to another embodiment of the invention.

FIG. 5 represents, schematically and partially, an integrated unit and its assembly on a low-pressure reduction gear according to another embodiment of the invention.

DESCRIPTION OF THE EMBODIMENTS

FIG. 2 represents, schematically and partially, an integrated unit 220 for transferring rotary power from a de-icing system according to an embodiment of the invention. Throughout the description, a pair of propeller blades is formed of a blade 1101 and its opposite 1102, and the blade and its opposite are connected to a section 1121, 1122 of the nose cone 110 of the turbomachine. In addition, the blades 1101, 1102, the sections 1121, 1122 and the nose cone 110 comprise heated mats composed of a network of resistances 1111, 1112, 1113, 1114, 1115, 1116 used to de-ice them. Although it is not shown on the figures, the propeller blades and the nose cone can also be connected to one another in parallel.

The integrated unit 220 of the electrical circuit of the de-icing system comprises two redundant electrical channels. The first electrical channel comprises a rotary transformer 2221 connected to a DC-to-AC voltage converter 2231 (or DC/AC converter 2231) at its input and to a power switch 2211 at its output. The second electrical channel also comprises a rotary transformer 2222 connected to a DC-to-AC voltage converter 2232 (or DC/AC converter 2232) at its input and to a power switch 2212 at its output. Each rotary transformer 2221 and 2222 comprises a static part and a rotary part. These two rotary transformers 2221 and 2222 can be completely independent, or each have a winding around one and the same magnetic circuit. The power switches 2211, 2212 of the two channels are connected to at least one pair of propeller blades 1101, 1102 and to the nose cone 110 of the turbomachine. On this figure, for the sake of clarity, only one pair of propellers is shown. However, the switches 2211, 2212 of the two channels can be connected to all the pairs of propeller blades of the turbomachine. The DC/AC converters 2231, 2232 are each connected at the input to a high-voltage DC power supply 2321, 2322 and at the output to the static part of the rotary transformer associated with their electrical circuit. In order to generate a low-voltage electrical power supply, the integrated unit 220 also comprises, in each electrical channel, a DC-to-DC voltage converter 2241, 2242 (or DC/DC converter). The DC/DC converter 2241 of the first channel is connected at the input to the high-voltage DC electrical power supply 2321 and makes it possible to generate a low voltage in the first channel; while the DC/AC converter 2242 is connected at the input to the high-voltage DC electrical power supply 2322 and makes it possible to generate a low voltage in the second electrical channel. The two DC/DC converters 2241 and 2242 more generally make it possible to supply the low-voltage power to the control electronics of the turbomachine.

The integrated unit 220 is also connected to the control system 230 of the turbomachine. Thus, the only ancillary power connections connected to the integrated unit 220 are those of the high-voltage electrical power supply 2411, 2412 and those for communication 2431, 2432. It is however possible to have an additional ancillary power connection between the low-voltage electrical power supply 2311, 2312 and the integrated unit 220, if the unit 220 does not comprise any DC/DC converters.

FIG. 3 represents, schematically and partially, the assembly of the rotary parts 3201, 3202 of the integrated unit 320 on a low-pressure reduction gear 330 according to an embodiment of the invention.

The components of the integrated unit 320 are placed in a casing of a cylindrical shape enclosed by the flanges 321 and 322. The casing and its flanges 321 and 322 are assembled on the reduction gear 330. Thus, the integrated unit 320 is secured to the reduction gear 330; in particular its rotary parts 3201, 3202 are secured to the rotary parts of the reduction gear 330. The flanges 321 and 322 are attached to the reduction gear 330 using, for example, sets 370 of screws and nuts. The flanges 321 comprise ventilation grilles 361, 362 to be able to evacuate the hot air from the integrated unit 320, the ventilation grilles 362 of the flange 322 facing the ventilation grilles 360 of the reduction gear 330. More specifically, the ventilation grille 361 of the flange 321 allows cool air to enter the integrated unit 320, while the ventilation grilles 360 of the reduction gear 330 and 362 of the flange 322 make it possible to evacuate hot air from the integrated unit 320. In this embodiment, the sets 370 of screws and nuts for assembling the integrated unit 320 on the reduction gear 330 are placed inside the integrated unit 320.

The reduction gear 330 comprises a fixed shaft 331 through which the ancillary power connections 3411, 3412, 3431, 3432 are routed to the integrated unit 320.

FIG. 4 shows, schematically and partially, the assembly of the rotary parts 4201, 4202 of the integrated unit 420 on a low-pressure reduction gear 430 according to another embodiment of the invention.

The components of the integrated unit 420 are placed in a cylindrical casing enclosed by two flanges 421 and 422. The casing is assembled on the reduction gear 430 via its flanges 421 and 422. Thus, the integrated unit 420 is secured to the reduction gear 430; in particular its rotary parts 4201, 4202 are secured to the rotary parts of the reduction gear 430. The flanges 421 and 422 are attached to the reduction gear 430 using, for example, sets 470 of screws and nuts. The flange 421 comprises a ventilation grille 461 to be able to expel hot air from the integrated unit 420. More specifically, the ventilation grille 461 allows cool air to enter the integrated unit 420. The reduction gear 430 still comprises ventilation grilles 460 used to expel hot air from the integrated unit 420. In this embodiment, the sets 470 of screws and nuts for assembling the integrated unit 420 on the reduction gear 430 are placed outside the integrated unit 420.

As previously, the reduction gear 430 comprises a fixed shaft 431 through which the ancillary power connections 4411, 4412, 4431, 4432 are routed to the integrated unit 420.

FIG. 5 shows, schematically and partially, the assembly of the integrated unit 520 on a low-pressure reduction gear 530 according to an embodiment of the invention.

The fixed parts 5203, 5204 of the integrated unit 520 are secured to the fixed shaft 531 of the low-pressure reduction gear 530. More specifically, the integrated unit 520 comprises a rotationally immobilized hollow and sliding shaft 571. This immobilization is for example embodied by a key. The hollow shaft 571 makes it possible to run the different ancillary power connections from the integrated unit 520 via the fixed shaft 531 of the reduction gear 530, such as the electrical power supplies 5411, 5412 and the communications 5431, 5432 with the control system of the turbomachine. Then translational immobilization of the hollow shaft 571 is for example done by a slotted nut 570 mounted at the end of the shaft 571.

The rotary and fixed parts of the FIGS. 3, 4 and 5 comprise the rotary transformers, the DC/AC converters, the DC/DC converters and the power switches of the two electrical channels described in FIG. 2. The fixed part comprises the static part of each of the rotary transformers, the DC/DC converters and the DC/AC converters, while the rotary part comprises the rotary part of each of the rotary transformers. The power switches can be in the fixed part or in the rotary part. If the switches are in the fixed part of the integrated unit, they are generally placed between the DC/AC converters and the static part of each of the rotary transformers; whereas if they are in the rotary part of the integrated unit, they are generally placed between the rotary part of each of the rotary transformers and the resistances of the pairs of propeller blades and the nose cone of the turbomachine. By placing the switches in the rotary part of the integrated unit, volume can be freed up for the DC/AC converters and/or the outputs of the integrated unit can be brought closer to the resistances of the pairs of propeller blades and the nose cone.

The placement of the DC/AC converters, the DC/DC converters, the power switches and the rotary transformers within the integrated unit is suitable for meeting the restrictions on reliability and/or cooling. For example, to improve the cooling, the components most sensitive to temperature can be placed in contact with the outer surfaces of the casing of the integrated unit and close to the cool air ventilation grille. Or to limit the mechanical stress related to centrifugal forces, certain components of the rotary part of the integrated unit can be placed as close as possible to the axis of rotation.

In addition, the integrated unit 320, 420, 520 may comprise one or more fans 341, 342, 441, 442, 541, 542 secured to the rotary part 3201, 3202, 4201, 4202, 5201, 5202 of the integrated unit 320, 420, 520. These fans 341, 342, 441, 442, 541, 542 blow forced air to expel the heat from the integrated unit 320, 420, 520.

Fins 551, 552 can also be mounted on an outer and rotary surface of the integrated unit 520 (as shown in FIG. 5) to accelerate the surrounding air and create a forced air flow also used to expel heat from the integrated unit 520, in particular from the rotary elements 5201, 5202 of the integrated unit 520.

It is also possible to place the fins 561, 562 inside the integrated unit 520, in such a way that these fins 561, 562 are secured to the fixed parts 5203, 5204 of the integrated unit 520. These three cooling solutions can be embodied alone or in combination on the integrated unit 520, to adapt to different restrictions: cooling, overall dimensions, mass, etc.

In addition, advantageously, the elements placed in the rotary parts of the integrated unit shown in FIGS. 3, 4 and 5 are assembled and distributed symmetrically around the reduction gear in order to ensure the balancing of the assembly and avoid creating imbalances.

The integrated unit can also have its own bearings, particularly on the side of the flanges, if restrictions on integration or other restrictions require it.

Whatever the embodiment of the invention, the integrated unit comprises a plurality of rotary transformers, each transformer being associated with a separate pair of propeller blades. If there are for example N pairs of propeller blades (N being greater than or equal to 1), there will be N rotary transformers in each electrical channel of the integrated unit. Within an electrical channel, each rotary transformer is powered solely during the activation time of the corresponding blade pair. To power the rotary transformers of one and the same channel, the integrated unit may comprise a single DC/AC converter per channel (and where applicable, also a single DC/DC converter) and the power switch comprises switches for activating the rotary transformer associated with the active blade pair.

Within one and the same electrical channel, it is also possible to combine the rotary transformer and the power switch. Thus, the rotary transformer has as many outputs as there are pairs of propeller blades to be powered, and the switch combined with the rotary transformer acts as a selector to select the output of the rotary transformer corresponding to the active blade pair. More specifically, an electromagnetic actuator is associated with a single primary circuit of the rotary transformer and the selector is controlled to position the actuator, and therefore the primary circuit of the rotary transformer, with the secondary circuit of the rotary transformer corresponding to the blade pair active during the de-icing of this blade pair. There is always a single DC/AC converter per channel.

Whatever the embodiment, the DC/AC converter can be single-phase, three-phase, or have another topology.

Whatever the embodiment, the rotary transformer can be single-phase, three-phase, or have another topology.

Whatever the embodiment, the switch can be direct-current or alternating-current.

The invention claimed is:

1. An integrated unit for transferring rotary power from an electrical circuit for de-icing at least one pair of propeller blades and a nose of a turbomachine comprising:
    a rotary transformer comprising a static part and a rotary part;
    a DC-to-AC voltage converter connected at an output of the DC-to-AC voltage converter to the static part of the rotary transformer and connected at an input of the DC-to-AC voltage converter to a DC electrical power supply, and
    a power switch connected to the rotary transformer and configured to transmit electrical power to the at least one pair of propeller blades and to a nose cone of the turbomachine,
    wherein the integrated unit comprises a DC-to-DC voltage converter connected at an input of the DC-to-DC voltage converter to the DC electrical power supply of the DC-to-AC voltage converter and configured to decrease a voltage from the DC electrical supply and generate a low-voltage electrical power supply.

2. The integrated unit as claimed in claim 1, comprising a first electrical channel comprising the rotary transformer, the DC-to-AC voltage converter and the power switch, and a second electrical channel comprising a second rotary transformer comprising a static part and a rotary part, a second DC-to-AC voltage converter and a second power switch, the second DC-to-AC voltage converter being connected at an output of the second DC-to-AC voltage converter to the static part of the second rotary transformer and connected at an input of the second DC-to-AC voltage converter to the DC electrical power supply and the second power switch being connected to the second rotary transformer and configured to transmit electrical power to the at least one pair of propeller blades and to the nose cone of the turbomachine.

3. The integrated unit as claimed in claim 2, wherein each of the first electrical channel and the second electrical channel comprise the DC-to-DC voltage converter connected at the input of the first electrical channel and the second electrical channel to the DC electrical power supply of the DC-to-AC voltage converter of the first electrical channel and the second electrical channel and configured to generate the low-voltage electrical power supply.

4. The integrated unit as claimed in claim 2, comprising the rotary transformer and the second rotary transformer, and within each electrical channel, each rotary transformer is associated with a separate pair of propeller blades of the at least one pair of propeller blades; the DC-to-AC voltage converter is common to the rotary transformers of the electrical channel and the switch comprises switches configured to select one of the rotary transformers of the electrical channel.

5. The integrated unit as claimed in claim 2, wherein, in each of the first electrical channel and the second electrical channel, the rotary transformer and the power switch are combined.

6. The turbomachine comprising the integrated unit for transferring rotary power as claimed in claim 1, and a low-pressure reduction gear, the integrated unit being secured to the low-pressure reduction gear.

7. The turbomachine as claimed in claim 6, wherein the low-pressure reduction gear comprises a rotary part and a fixed shaft, the rotary part of the rotary transformer of the integrated unit is secured to the rotary part of the low-pressure reduction gear, and the static part of the rotary transformer, the power switch and the DC-to-AC voltage converter of the integrated unit are secured to the fixed shaft of the low-pressure reduction gear.

8. The turbomachine as claimed in claim 6, wherein the low-pressure reduction gear comprises a rotary part and a fixed shaft, the rotary part of the rotary transformer and the power switch of the integrated unit are secured to the rotary part of the low-pressure reduction gear and the static part of the rotary transformer and the DC-to-AC voltage converter of the integrated unit are secured to the fixed shaft of the low-pressure reduction gear.

9. The turbomachine as claimed in claim 6, comprising fins located on an outer surface of the integrated unit and secured to the rotary part of the low-pressure reduction gear.

10. The turbomachine as claimed in claim 6, comprising a fan secured to the rotary part of the low-pressure reduction gear.

* * * * *